United States Patent [19]

Mimura et al.

[11] Patent Number: 5,196,150
[45] Date of Patent: Mar. 23, 1993

[54] MAINTAINING DIES IN AN INJECTION PRESS PARALLEL TO EACH OTHER

[75] Inventors: Kazuhiro Mimura, Hiratsuka; Yosuke Sasaki, Zama; Noboru Harashima, Fujisawa, all of Japan

[73] Assignee: Kabushiki Kaisha Komatsu Seisakusho, Tokyo, Japan

[21] Appl. No.: 536,566
[22] PCT Filed: Oct. 30, 1989
[86] PCT No.: PCT/JP89/01115
§ 371 Date: Aug. 23, 1990
§ 102(e) Date: Aug. 23, 1990
[87] PCT Pub. No.: WO90/05058
PCT Pub. Date: May 17, 1990

[30] Foreign Application Priority Data

Oct. 31, 1988 [JP] Japan .................. 63-275468

[51] Int. Cl.⁵ .............................. B29C 45/80
[52] U.S. Cl. .................... 264/40.5; 264/328.11; 425/149; 425/150; 425/575; 425/592; 425/595
[58] Field of Search ............ 264/40.5, 328.7, 328.9, 264/328.11; 425/149, 150, 555, 574, 575, 589, 592, 593, 595, 450.1, 451.5, 451.6, 451.9; 100/46

[56] References Cited

U.S. PATENT DOCUMENTS

| | | | |
|---|---|---|---|
| 3,669,599 | 6/1972 | Snider et al. | 425/451.7 |
| 4,519,763 | 5/1985 | Matsuda et al. | 425/451.2 |
| 4,747,982 | 5/1988 | Nakatsukasa et al. | 264/40.5 |
| 4,917,840 | 4/1990 | Harada et al. | 425/150 |
| 4,923,383 | 5/1990 | Kurumaji et al. | 264/40.5 |

FOREIGN PATENT DOCUMENTS

| | | |
|---|---|---|
| 0272138 | 6/1988 | European Pat. Off. . |
| 0310807 | 4/1989 | European Pat. Off. . |
| 58-167132 | 10/1983 | Japan . |
| 58-167137 | 10/1983 | Japan . |
| 60-37297 | 2/1985 | Japan . |
| 60-151015 | 8/1985 | Japan . |
| 60-179218 | 9/1985 | Japan . |
| 62-202718 | 9/1987 | Japan . |
| 63-005919 | 1/1988 | Japan . |
| 63-91218 | 4/1988 | Japan . |
| 1-264823 | 10/1989 | Japan . |

OTHER PUBLICATIONS

Patent Abstracts of Japan, vol. 9, No. 316 (M-438)(2039), published Dec. 12, 1985, for JP (A) 60-151015.
Patent Abstracts of Japan, vol. 12, No. 201 (M-707)(3048), published Jun. 10, 1988, for JP (A) 63-005919.
Patent Abstracts of Japan, vol. 14, No. 26 (M-921)(3969), published Jan. 18, 1990, for JP (A) 1-264823.

Primary Examiner—Jill L. Heitbrink
Attorney, Agent, or Firm—Richards, Medlock & Andrews

[57] ABSTRACT

In an injection press having a mold in the form of a moveable die positioned on a moveable plate and a fixed die positioned on a fixed plate, the moveable die is moved to a compression starting position which is spaced slightly from the fixed die, the resin to be molded is injected into the mold cavity between the two dies, and the moveable die is then moved towards the fixed die to compress the thus injected resin. The compression starting position is determined by mechanical positioning means which can adjust the compression starting position. The stroke deviation for the compression can be adjusted by detecting the position of the moveable plate during the compression stroke so that the levelness of the moveable die can always be maintained during the compression stroke. Thus, the parallelism of the two dies can be stably maintained against the injection pressure.

20 Claims, 8 Drawing Sheets

| PROCESS | CONDITION DETERMINATION | | | FORMING OPERATION | | | | | | | |
|---|---|---|---|---|---|---|---|---|---|---|---|
| | LOCK TYPE TOUCH | COMPRESSION POSITIONING | SETTING COMPRESSION CYLINDER | OPENING OF DIE | INITIAL STAGE | CLOSING OF DIE | LOCK POSITIONING | COMPRESSION | RELEASE OF COMPRESSION | RELEASE OF LOCK | OPENING OF DIE |
| HEIGHT ADJUSTER LONGEST / SHORTEST | | | ORIGIN | | | | | | | | |
| LIFT CYLINDER LONGEST / SHORTEST | | | | | | | | | | | |
| COMPRESSION CYLINDER LONGEST / SHORTEST | | | | | ORIGIN | | | | | | |
| LOCK CYLINDER RELEASE | | | | | | | | | | | |
| OPENING DEGREE OF DIE | | | | ORIGIN | | | | | | | |
| REMARKS | LOCK LIFT FRAME, APPLY PRESSURE UPWARDS TO LIFT CYLINDER TO ELIMINATE BACKLASH AND CAUSE IT CONTACT WITH DIE WITH HEIGHT ADJUSTER | DEFINE COMPRESSION STROKE BY HEIGHT ADJUSTER | COMPRESSION CYLINDER CONTACT DIE IN THE STATE SHOWN LEFT. DETERMINE ORIGIN | | COMPRESSION CYLINDER SHORTEST STROKE LOCK RELEASEMENT OPEN DIE BY LIFT CYLINDER | LIFT CYLINDER | LOCK LIFT FRAME, APPLY PRESSURE UPWARDS TO LIFT CYLINDER TO ELIMINATE BACKLASH | | APPLY PRESSURE TO CYLINDER COMPRESSION CYLINDER | LOCK CYLINDER | LIFT CYLINDER |

MAINTAINING DIES IN AN INJECTION PRESS PARALLEL TO EACH OTHER

TECHNICAL FIELD

The present invention relates to an injection press device and a forming method therefor, and, more particularly, to an improvement in an injection press device and a forming method therefor capable of satisfactorily maintaining the parallelism of dies at the time of die clamping work.

BACKGROUND ART

Hitherto, as a method of determining the compression stroke for clamping the die at the time of injection press forming and injection compression forming, there has been (1) a structure as disclosed in Japanese patent Laid-Open No. 58-167132, Japanese Patent Laid-Open No. 58-167137 and the like in which it is determined by inserting a key between a moveable plate and an end plate or between a fixed plate and a moveable plate, and (2) a structure as disclosed in Japanese Patent Laid-Open No. 60-179218, Japanese Patent Laid-Open No. 60-37297 and the like in which a positioning cylinder is provided between the moveable plate and the fixed plate so that it is determined by the cylinder stroke.

However, according to the above-described structures, only the compression stroke is determined and means to maintain the parallelism between the dies has not been described. As for the parallelism of the dies, parallelism from the compression starting point becomes critical in injection press forming in which the compression stroke is relatively large with respect to that in injection compression forming. If satisfactory parallelism cannot be realized, the action of the molten resin is influenced, causing the quality of the product to become unsatisfactory.

Accordingly, an object of the present invention is to provide an injection press device and a forming method therefor capable of realizing a satisfactory die parallelism and from which products of good quality can thereby be obtained.

DISCLOSURE OF THE INVENTION

In order to achieve the above-described object, an injection press device according to the present invention is characterized by: a fixed die plate supporting a fixed die; a moveable die plate supporting a moveable die which is brought into contact with the fixed die and moved away from the same to a compression start position by liquid pressure means; an injection mechanism for injecting molten resin into a cavity formed by joining the two dies; mechanical positioning means fastened adjacent to the fixed die plate for the purpose of restricting the return movement of the moveable die plate at a compression starting position during a stroke of the moveable die plate; an adjuster fastened adjacent to the fixed die plate for adjusting the height of the mechanical positioning means and adjusting the parallelism of the moveable die plate; compression liquid pressure means, provided independently from the liquid pressure means, for the purpose of moving the moveable die plate from the compression start position towards the fixed die plate; a servo valve for controlling the quantity of operating fluid to be supplied to the compression liquid pressure means; a position sensor for detecting the position of the moveable die plate; and control means for adjusting the degree of opening of the servo valve connected to the compression liquid pressure means in accordance with the result of detection performed by the position sensor.

According to the above-described structure, during the stroke of the moveable die with respect to the fixed die, the moveable die is first moved to a required opening degree by a lift cylinder or the like, and it becomes the compression starting position. At this position, the mechanical positioning means is operated and the moveable die plate is maintained at the compression starting position. After the above-described maintaining operation performed by the mechanical positioning means, the adjuster is operated so that the height of the mechanical positioning means can be adjusted. Since the mechanical positioning means influences the parallelism of the moveable die plate, the moveable die plate can be finely adjusted by properly operating the adjuster. Thus, the rearward movement or the like of the moveable die plate due to the injection pressure can be prevented, and the parallelism between the two dies can be maintained. Furthermore, the compression stroke is conducted with detecting the levelness of the die plate by the position sensor with the lift frame of the moveable die plate positioned at the compression starting position by the mechanical positioning means. Thus, the levelness of the die can be maintained by adjusting the flow to be supplied to the compression fluid pressure means. Therefore, the action of molten resin in the cavity can be always stabilized so that stabilized quality products can be obtained.

In one embodiment, the mechanical positioning means may comprise projection and recess fitting portion disposed between the fixed die plate and the moveable die plate and clamping means for clamping the fitting portion for maintaining the position. It may comprise a lift guide rod for guiding the stroke of the moveable die plate and screw-fixed to the fixed die plate and means for rotating the lift guide rod, and the mechanical positioning means is secured to the lift guide rod.

As a result, the mechanical positioning can be conducted while maintaining the positional relationship between the two dies and while causing the guide function of the moveable die plate having long stroke to be conducted. Since the parallelism is adjusted by vertically moving the lift guide rod to which the moveable die plate is integrally formed, the adjustment work can be completed quickly.

In another case, the mechanical positioning means may comprise compression liquid pressure means moveably fastened to the fixed die plate and capable of moving to the backside of the moveable die plate. The adjuster may be provided with a screw rod fastened to the fixed die plate and connected to a frame having a supporting point of movement of the compression liquid pressure means.

As a result, the mechanical positioning means and the adjuster can be concentrated in the fixed die plate portion so that the size of the fitting structure can be reduced.

When the compression fluid pressure means is interposed between the lift frame and the moveable die plate so that only the compression process is performed by the compression fluid pressure means, the flow control to the compression fluid pressure means can be assuredly conducted. As a result, the control of the levelness of the die can be satisfactorily conducted.

One embodiment of the invention is a specific combination of the above-described structures, that is, it comprises a fixed die plate supporting a fixed die; a lift guide rod erected from the fixed die plate; a moveable die plate supporting a moveable die which is brought into contact with the fixed die and moved away from the same by a liquid pressure means to a compression start position under the guidance of the lift guide rod; an injection mechanism for injecting molten resin into a cavity formed by joining the two dies; mechanical positioning means fastened adjacent to the fixed die plate for the purpose of restricting the return movement of the moveable die plate at a compression starting position during a stroke of the moveable die plate; an adjuster for adjusting the height of the mechanical positioning means and adjusting the parallelism of the moveable die plate; compression liquid pressure means, provided independently from the liquid pressure means, for the purpose of moving the moveable die plate from the compression start position towards the fixed die plate; a servo valve for controlling the quantity of operating fluid to be supplied to the compression liquid pressure means; a position sensor for detecting the position of the moveable die plate; and control means for adjusting the degree of opening of the servo valve connected to the compression liquid pressure means in accordance with the result of detection performed by the position sensor, wherein the mechanical positioning means comprises a sleeve provided for the moveable die plate and arranged to be penetrated by a lift guide rod, a catcher case secured to the lift guide rod and into which the sleeve is fitted and clamping means fastened to the catcher case and for abutting the sleeve, and the adjuster comprises a lift guide rod screw-fixed to the fixed die plate and means for rotating the lift guide rod.

In another embodiment, a structure may be employed which comprises: a fixed die plate supporting a fixed die; a frame integrally formed with the fixed die plate; a lift guide rod erected from the fixed die plate; a moveable die plate supporting a moveable die which is brought into contact with the fixed die and moved away from the same to a compression start position by liquid pressure means fastened to the frame; an injection mechanism for injecting molten resin into a cavity formed by joining the two dies; mechanical positioning means fastened adjacent to the fixed die plate for the purpose of restricting the return movement of the moveable die plate at a compression starting position during a stroke of the moveable die plate; an adjuster for adjusting the height of the mechanical positioning means and adjusting the parallelism of the moveable die plate; compression liquid pressure means, provided independently from the liquid pressure means, for the purpose of moving the moveable die plate from the compression start position towards the fixed die plate; a servo valve for controlling the quantity of operating fluid to be supplied to the compression liquid pressure means; a position sensor for detecting the position of the moveable die plate; and control means for adjusting the degree of opening of the servo valve connected to the compression liquid pressure means in accordance with the result of detection performed by the position sensor, wherein the mechanical positioning means comprises a compression cylinder moveably fastened to the moveable die plate and capable of moving to the back side of the moveable die plate and the adjuster is provided with a screw rod penetrating the fixed die plate and connected to the mechanical positioning means so that the mechanical positioning means can be vertically moved.

According to any of the structures described above, the stroke of the die is correctly defined to the compression stroke starting position. Furthermore, the parallelism of the dies at the compression start can be secured. Therefore, the action of the molten resin in the die can be always constant. Therefore, products of stable quality can be obtained. Furthermore, since the positioning function is mechanically conducted, the positioning work can be extremely stably conducted.

Furthermore, according to the present invention, there is provided an injection press forming method for injecting and supplying molten resin to a cavity formed by a die and performing a forming by compressing and cooling, the injection press forming method being characterized by: utilizing a sensor to detect the position of a moveable die plate with respect to a fixed die plate; controlling the flow and the pressure level of operating fluid to a plurality of compression cylinders in accordance with the result of the detection; and performing a compression process while maintaining the parallelism of the die plate with respect to the fixed die plate when injection is performed after the moveable die plate has been positioned to a compression starting position by mechanical positioning means and the plurality of compression cylinders disposed between a lift frame and the moveable die plate are operated so as to move and perform the compression with the die closed.

BEST MODE FOR CARRYING OUT THE INVENTION

Embodiments of injection press device according to the present invention will be described in detail with reference to the drawings. FIGS. 1 to 10 illustrate a first embodiment of the present invention.

Figure 1:
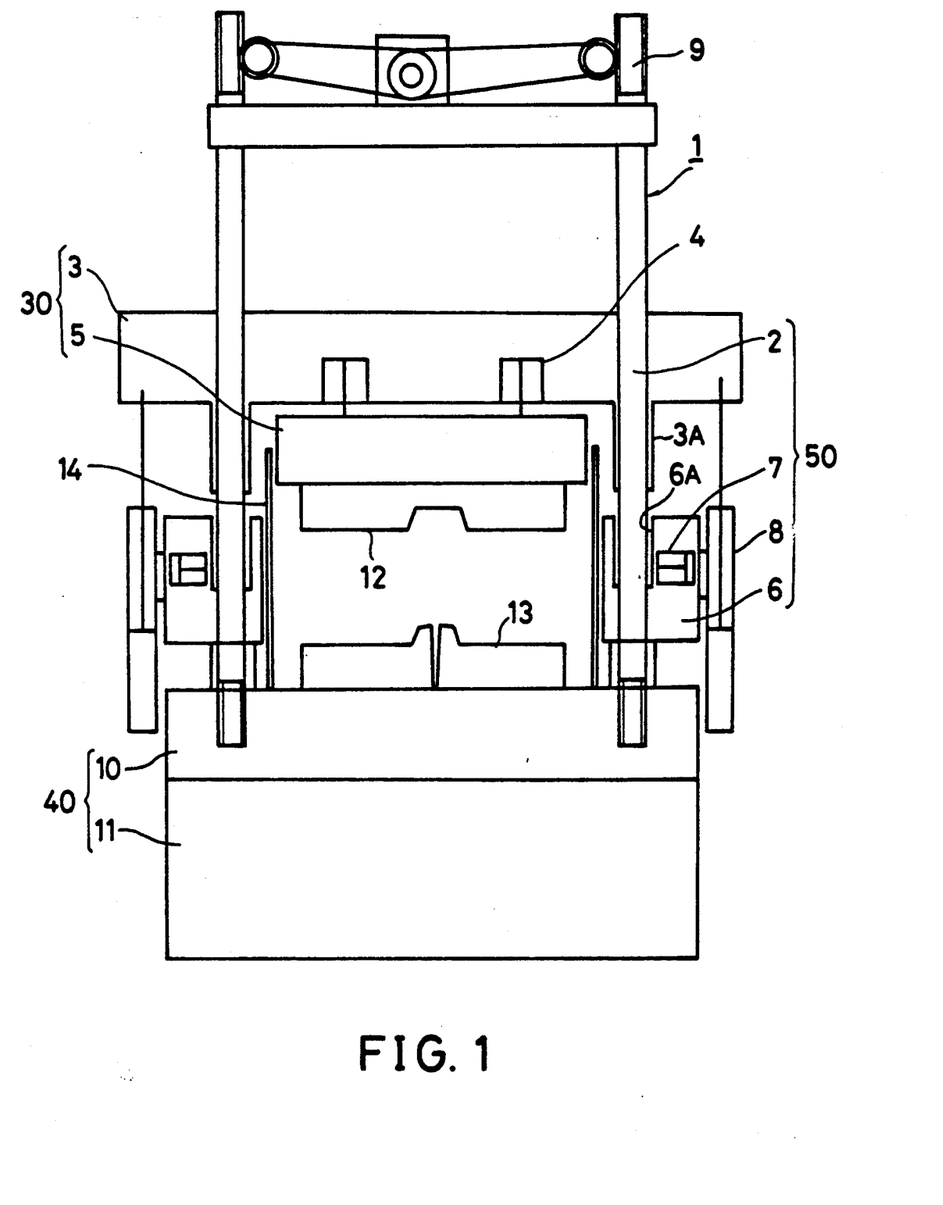
FIG. 1 is a front elevational view of an injection press device according to a first embodiment of the present invention.

Referring to FIG. 1, reference numeral 1 represents an injection press comprising a movable plate 30 and a fixed plate 40. The fixed plate 40 comprises a die plate 10 to which a lower die 13 can be fastened and a frame 11 for supporting the die plate 10. The die plate 10 has four erected lift guide rods 2. The moveable plate 30 comprises a lift frame 3 and an upper die plate 5. The lift frame 3 is positioned above the fixed die plate 10, with the four lift guide rods 2 extending through the lift frame 3. The lift frame 3 is capable of being moved vertically. The upper die plate 5 is supported from the lift frame 3 by four compression cylinders 4 which are included in the lift frame 3. An upper die 12 is secured to the upper die plate 5 in such a manner that the upper die 12 confronts the lower die 13 of the fixed plate 40. On each of the four lift guide rods 2 a catcher case 6 is provided, with each catcher case 5 including a lock cylinder 7. Each catcher case 6 has a fastening recessed portion 6A at the portion through which the respective lift guide rod 2 passes. The lift frame 3 is provided with four insertion sleeves 3A, with each insertion sleeve 3A being positioned about a respective lift guide rod 2 so as to fit within the fastening recessed portion 6A of the respective catcher case 6. In each catcher case 6, the lock cylinders 7 is able to project into the fastening recessed portion 6A so that the lock cylinder abuts against the outer surface of the inserted sleeve 3A. As a result, the insertion sleeve 3A is mechanically clamped and fixed when the lock cylinder 7 is extended into the fastening recessed portion 6A. Four lift cylinders 8 ar provided for lifting the lift frame 3, which each lift cylinder 8 being integrally fastened to a respective catcher case 6. As a result, the lift frame 3 can be lifted by the application of hydraulic power to the four lift cylinders 8.

Each of the lift guide rods 2 is fixed to the lower die plate 10 with a screw. Therefore, the upper die plate 5 can be vertically moved whenever the lift guide rods 2 rotate, and the catcher cases 6 integrally fastened to the lift guide rods 2 are simultaneously and vertically moved. Thus, the mechanical fixing devices 50, each consisting of a catcher case 6, a lock cylinder 7, a lift cylinder 8, and a lift guide rod 2, can be individually vertically adjusted. The height can be adjusted by individually rotating the lift guide rods 2 by means of height adjusters 9 disposed at the upper end portions of the lift guide rods 2.

An upper die 12 is secured to the upper die plate 5, while position sensors 14 for detecting the position of the upper die 12 relative to the lower die 13 are secured to the die plate 10.

Figure 2:
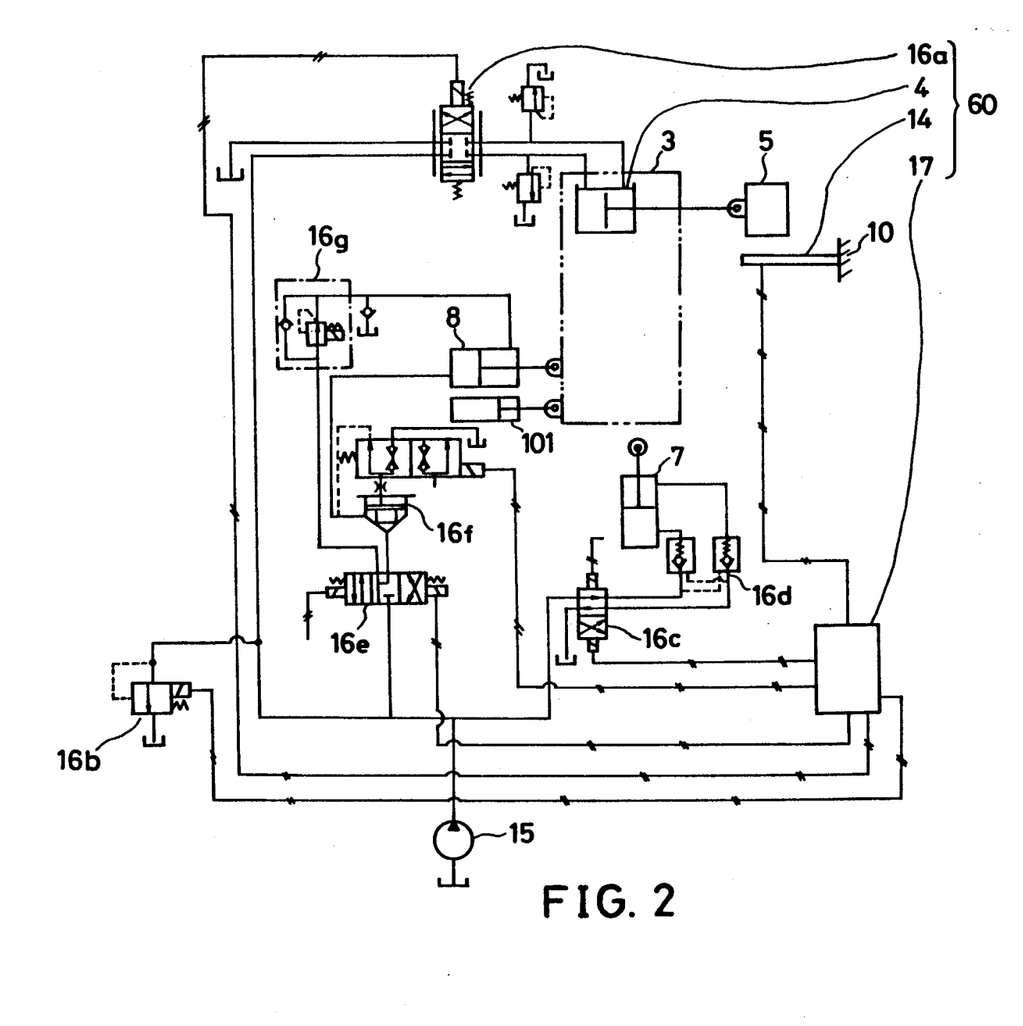
FIG. 2 is a circuit diagram for the injection press device according to the first embodiment of the present invention.

FIG. 2 is a circuit diagram of one of the movement control devices 60. In each motion control device 60, the compression cylinder 4, the lock cylinder 7 and the lift cylinder 8 are operated by receiving hydraulic pressure supplied from the pump 15 via a servo valve 16a for controlling the flow, a relief valve 16b for controlling the hydraulic pressure, an electromagnetic valve 16c, a pilot check valve 16d, an electromagnetic valve 16e, a cartridge valve 16f and a pressure reducing valve 16g. The circuit for the compression cylinder 4 adjusts the flow by its servo 16a, capable of controlling the flow, in response to a signal supplied from a control portion 17, the signal corresponding to the position detected by the position sensor 14. As a result of the adjustment the upper die 12 moves vertically and in parallel. Each of the movement control device circuits for moving the upper die 12 in parallel comprises a position sensor 14, a servo valve 16a, a control portion 17 and a compression cylinder 4. Although the above-described circuits are operated by a single pump, they may be operated independently.

Figure 3:
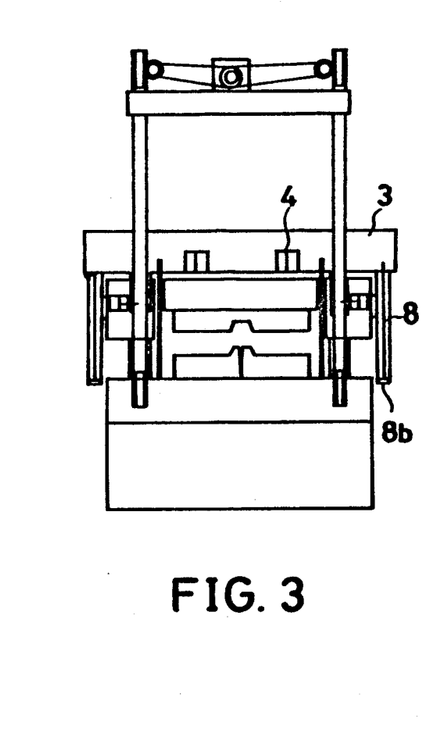
FIGS. 3 to 9 illustrate the operation of the first embodiment of the present invention.

The operation of the structure will now be described. First, the determination of the stroke at the time of the injection press forming will now be described with reference to FIGS. 3 to 6. The lift frame 3 is positioned at the lowermost point (each lift cylinder 8 is positioned at its shortest stroke end) and each compression cylinder 4 is also positioned at its shortest stroke end (as shown in FIG. 3). In this state, the lift frame 3 is mechanically locked to the catcher cases 6 by the mechanical fixing devices 50 by using the lock cylinders 7.

Figure 4:
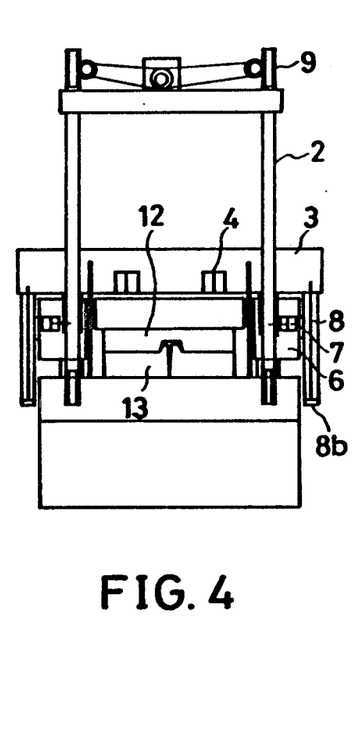
Figure 5:
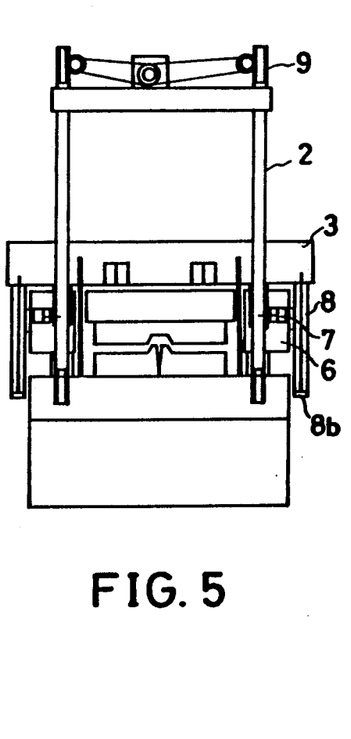
Figure 6:
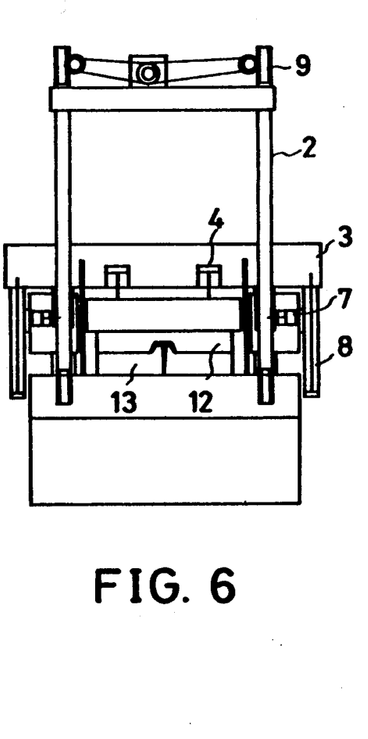

Then, hydraulic pressure is supplied to a port 8b of each left cylinder 8 so as to eliminate the backlash, and then the upper die 12 and the lower die 13 are brought into close contact with each other by the height adjusters 9 (see FIG. 4). At this time, since the height adjusters 9 can individually adjust the height of each of the four lift guide rods 2, the above-described close contact can be realized. Starting from the thus realized state, the lift frame 3 is moved upwardly by the height adjusters 9 by a necessary compression stroke (see FIG. 5). At this time, since the height of each of the lift guide rods 2 can be individually adjusted by the height adjusters 9, the initial parallelism can be maintained. Furthermore, in this state, the dies 12, 13 are brought into close contact with each other by the compression cylinders 4, the thus realized state being arranged to be the final position in the process of condition determination.

Then, the forming operation is started.

Figure 7:
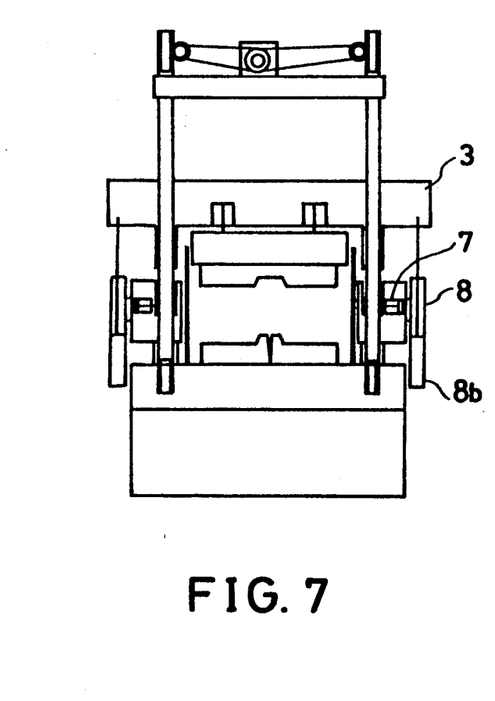
Figure 8:
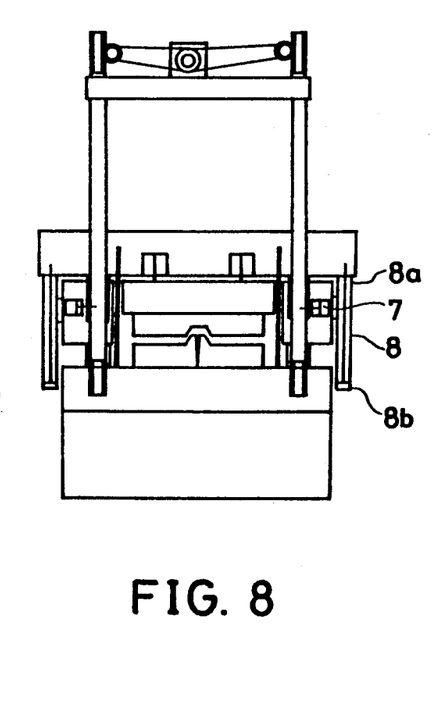
Figure 9:
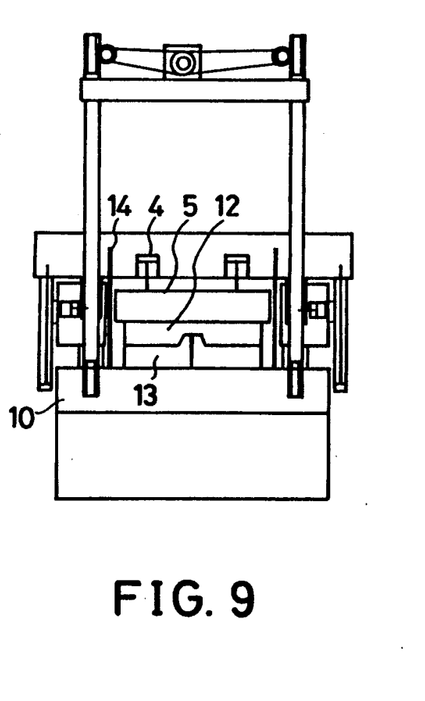
Figure 10:
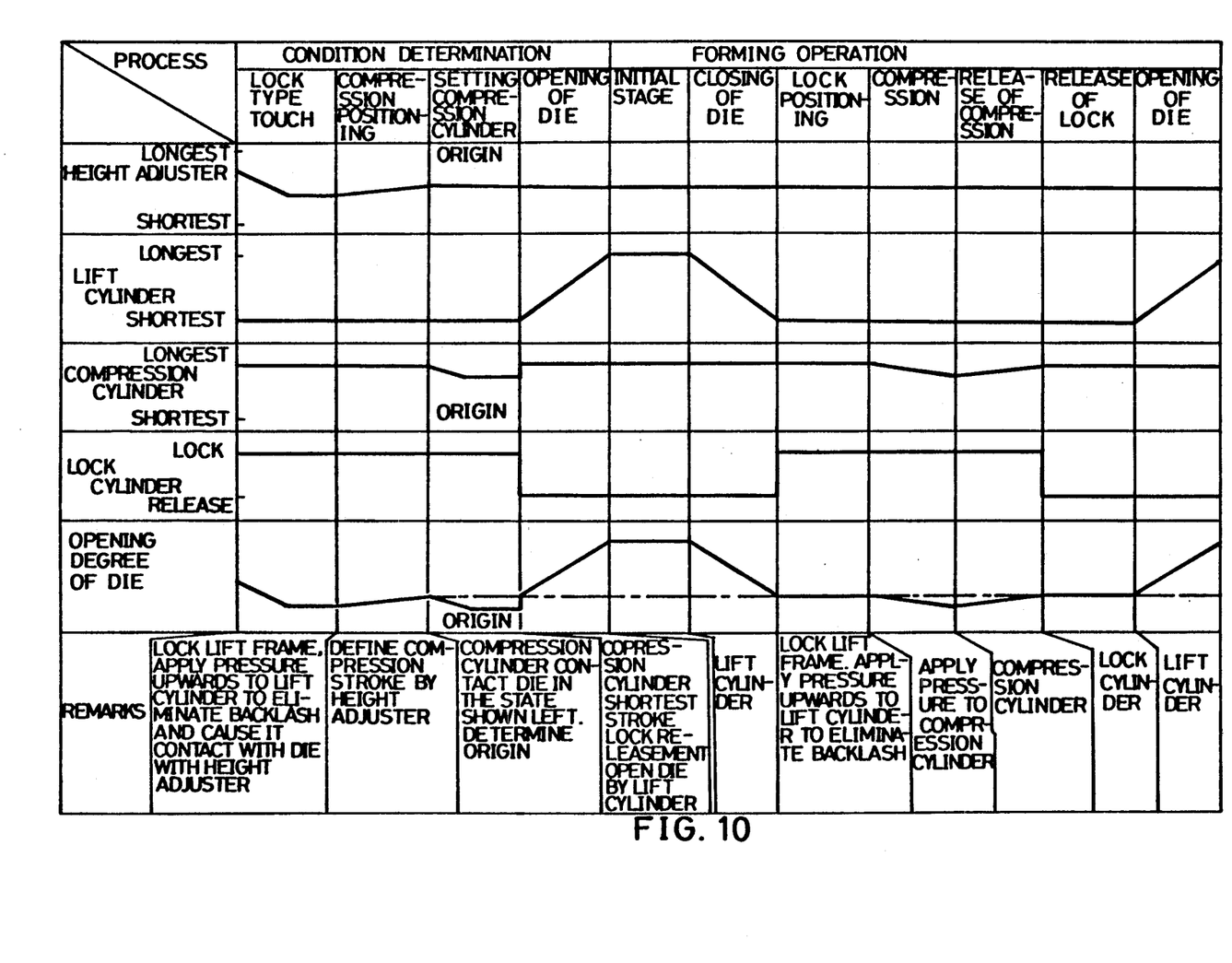
FIG. 10 is a graph which illustrates the stroke position and manufacturing process of the device according to the first embodiment of the present invention.

In the initial stage of the forming operation, as shown in FIG. 7, the lock cylinders 7 are released, and the compression cylinders 4 are positioned at their shortest stroke with hydraulic pressure being supplied to the port 8b of each lift cylinder 8 so that the lift frame 3 is moved upwardly. Then, as shown in FIG. 8, each lift cylinder 8 is positioned a its shortest stroke at the time of closing operation, while the lift frame 3 is locked by the lock cylinders 7, and hydraulic pressure is supplied to the port 8b of each lift cylinder 8 so as to eliminate the backlash at the time of the compression positioning. As shown in FIG. 9, at the time of the forming compression, the upper die 12 is lowered by the compression cylinders 4 so that resin enclosed in the die is press-formed. At this time, the position of each of the four corners of the upper die plate 5 is detected by the position sensors 14 disposed at the four corners of the die plate 10. The position and the speed of each corner of the upper die plate 5 are calculated by the respective control portion shown in FIG. 2. As a result, the die 12 is maintained parallel to die 13 while die 12 is moved towards die 13 by the movement control devices 60 which adjust the position and the speed of the compression cylinders 4 so as to maintain the die 12 in parallel with die 13 by adjusting the flow to each compression cylinder 4 through its respective flow control servo valve 16a. An example of the above-described sequential operations is shown in FIG. 10. Referring to FIG. 10, the axis of ordinate shows the position of each of the devices: the height adjusters 9, the lift cylinders 8, the degree of opening of the die, or the like, while the axis of abscissa shows the conditions after the die has been changed and the operations at the time of the forming work. Although the backlash is eliminated in the operation according to the above-described example by locking the lift frame 3 by the lock cylinders 7 and supplying hydraulic pressure to the ports 8b, a cylinder 101 (see FIG. 2) for eliminating the backlash may be provided additionally. Although the movement of the upper die plate 5 is detected at the time of the parallel movement of the upper die 12, it may be detected by a rod or the like of the compression cylinders 4.

Figure 11:
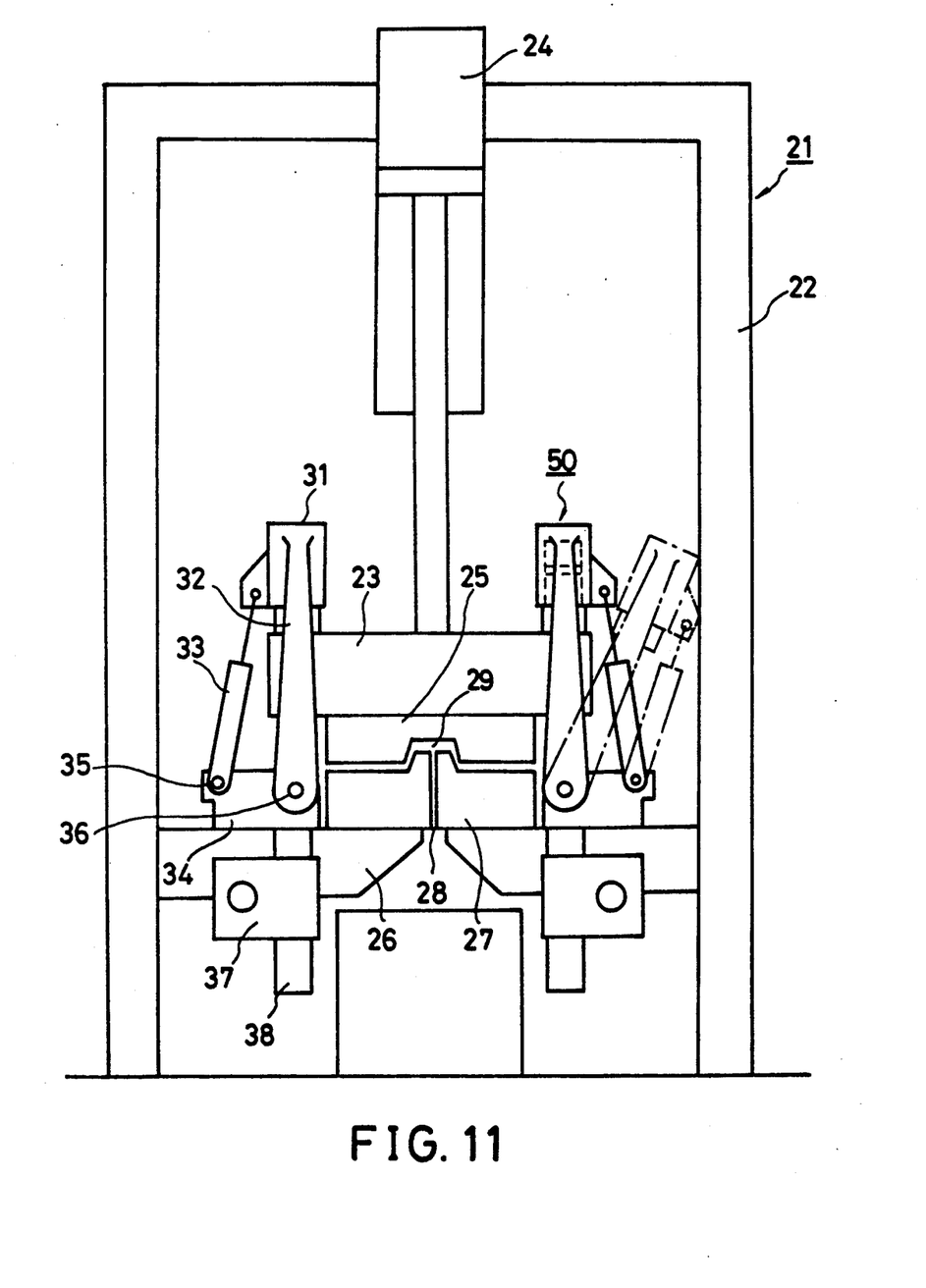
FIG. 11 is a front elevational view which illustrates the injection press device according to a second embodiment of the present invention.
Figure 12:
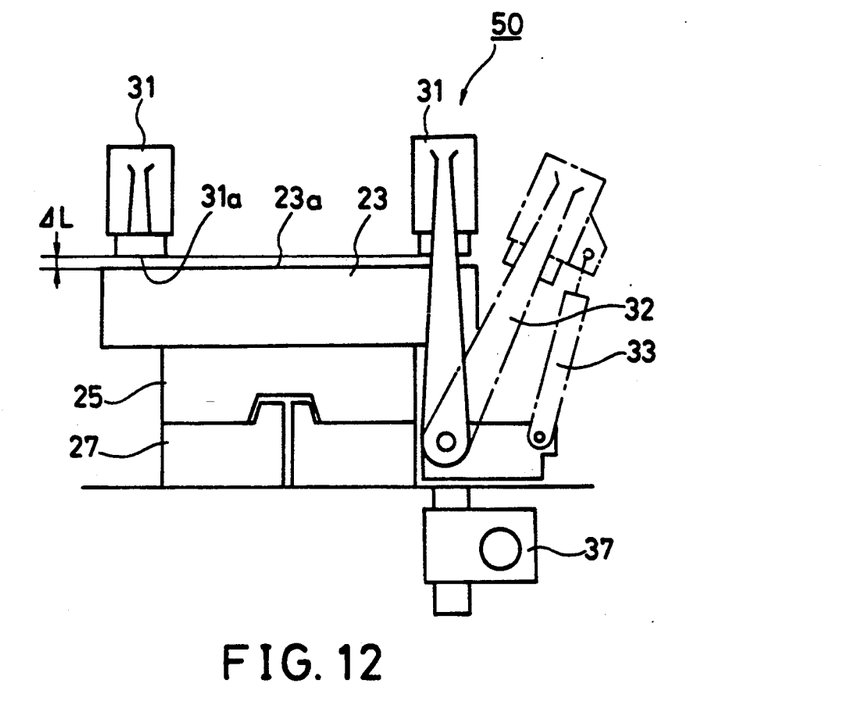
FIGS. 12 to 15 illustrate the operation of the second embodiment of the present invention.

FIGS. 11 to 15 illustrates a second embodiment of the present invention. Referring to FIG. 11, a lift cylinder 24 for receiving hydraulic pressure from a pump (omitted from illustration) and sliding a slide 23 is secured to a frame 22 of an injection press forming device 21. An upper die 25 is fastened to the slide 23, while a lower die 27 is fastened to a die plate 26. An injection port 28 is formed in the lower die 27 so that molten resin from an injection mechanism (omitted from illustration) disposed below a bolster can be injected, through the injection port 28 into a cavity 29 formed in the dies 25, 27. The slide 23 is mechanically fixed by the mechanical fixing devices 50 at a position at which the distance between the two dies 25, 27 becomes a predetermined distance. The mechanical fixing devices 50 comprise compression cylinders 31 for compressing resin injected into and enclosed in the cavity 29, links 32 for supporting the compression cylinders 31, lock cylinders 33 for tilting the links 32, four height adjusters 37 for securing links 32 and the lock cylinders 33 to cylinder frames 34 with pins 35 and 36 and moving the cylinder frames 34 in accordance with the thickness of the die and a predetermined distance between the two dies, and rods 38.

The operation will now be described. The determination of the compression stroke at the time of injection press forming will now be described with reference to FIGS. 12 to 15. The slide 23 is lowered by the lift cylinder 24 so that the upper die 25 and the lower die 27 are brought into close contact with each other. With the compression cylinders 31 maintained at their shortest stroke state, each mechanical fixing device 50 for operating the lock cylinder 33 which tilts the link 32 of the mechanical fixing device 50 is moved to a position shown in FIG. 12, that is, a position above the slide 23. Since the height adjusters are, in this state, respectively adjusted so as to make the distance between an upper surface 23a of the slide 23 and a lower surface 31a of each compression cylinder 31 a forming compression distance ($\Delta L$), the initial parallelism can be maintained (see FIG. 12). In this state, pressure may be applied to the compression cylinders 31 and the lock cylinders 33 so as to eliminate the backlash.

Then, the forming operation is started.

Figure 13:
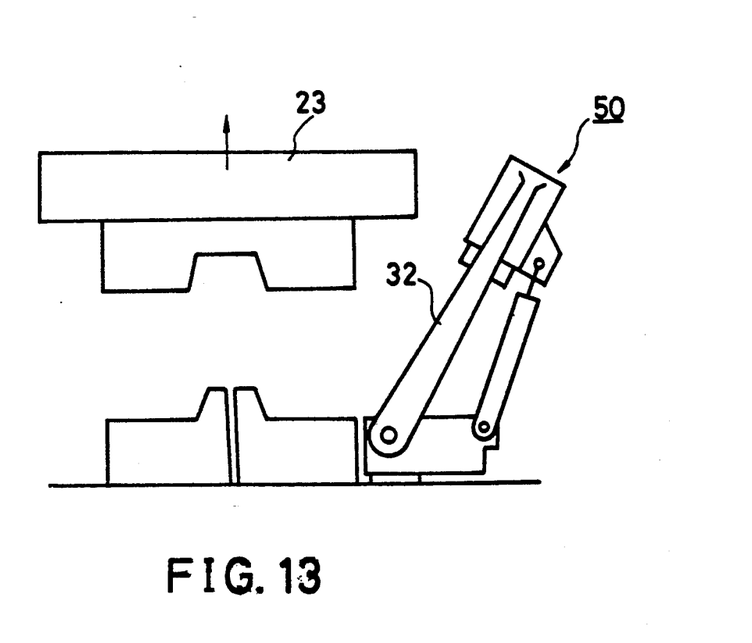
Figure 14:
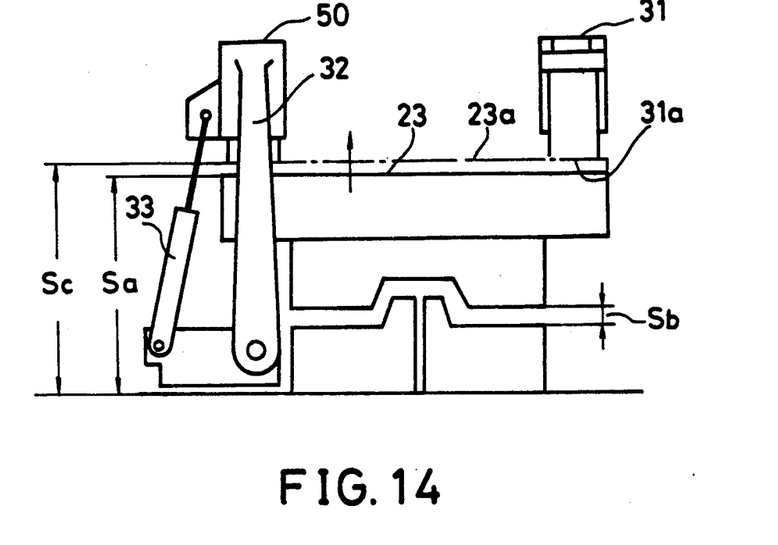
Figure 15:
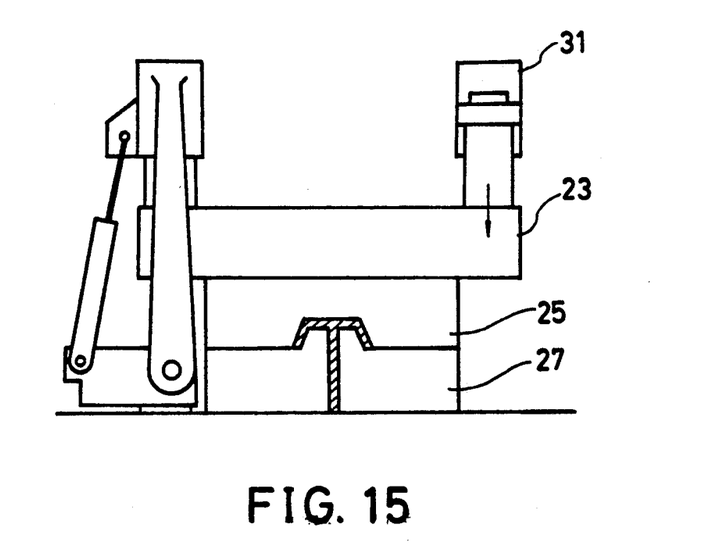

In the initial stage, as shown in FIG. 13, each lock cylinder 33 is contracted and the link 32 of the respective mechanical fixing device 50 is tilted. Furthermore, the lift cylinder 24 is contracted so as to raise and retain the slide 23. Then, as shown in FIG. 14, the slide 23 is lowered by the lift cylinder 24 at the time of closing the dies in such a manner that the upper surface 23a of the slide 23 is lower (Sa) than the forming compression starting point (Sc). After the moving, with each compression cylinder 31 positioned at its shortest stroke end, each lock cylinder 33 for tilting the link 32 of the respective mechanical fixing device 50 is operated by hydraulic pressure supplied from a pump (omitted from illustration) so that the respective mechanical fixing device 50 is tilted to a position shown in FIG. 14, that is, a position above the slide 23. Then, the lift cylinder 24 is contracted so that a lower surface 31a of each compression cylinder 31 and the upper surface 23a of the slide 23 are brought into contact with each other (as designated by a broken line). As shown in FIG. 15, the upper die 25 is lowered in parallel so that resin in the die is compressed and formed. At this time, the position of the slide 23 is detected by the position sensors 14 of the movement control devices 60 disposed at four corners of the die plate 26 (omitted from illustration) similarly to the above-described first embodiment. The speed is calculated by the control portions 17 so that the position and the each of the compression cylinders 31 are adjusted so as to maintain the two dies parallel by adjusting the flow by the respective servo valve 16a.

Although the compression stroke is determined by bringing the upper and the lower dies into contact with each other according to the above-described embodiment, the degree of change of the initial stage may be maintained by first individually adjusting the height adjusters 37 in the case where the size has been previously known.

Industrial Applicability

The injection press device and the method therefor according to the present invention can be applied to molding devices of a type which forms resin by injection and compression.

What is claimed is:

1. An injection press forming method for injecting and supplying molten resin to a cavity formed by a fixed die positioioned on a fixed die plate and a movable die positioned on a movable die plate, and performing a forming of the injected molten resin by compressing and cooling, said injection press forming method being characterized by:
    utilizing mechanical positioning means to position said moveable die plate, having said movable die associated therewith, to a compression starting position whereat injection of the molten resin into said cavity is performed;
    detecting the position of said moveable die plate with respect to said fixed die plate;
    controlling the flow and the pressure level of operating fluid to a plurality of compression cylinders, disposed between a lift frame and said moveable die plate, in accordance with the result of the detection of the position of the moveable die plate in order to compress the injected molten resin while maintaining the parallelism of said moveable die plate with respect to said fixed die plate during the compression of the injected molten resin.

2. An injection press device adapted to utilize an injection mechanism to inject molten resin into a cavity, formed by joining a moveable die and a fixed die, and to effect injection press forming of the injected molten resin, said injection press device being characterized by:
    a fixed die plate adapted to support said fixed die;
    a moveable die plate adapted to support said moveable die;
    die moving means adapted to reciprocally move said moveable die plate to bring said movable die supported thereby towards said fixed die supported by said fixed die plate and then to move the supported moveable die away from the supported fixed die to a compression starting position;
    said fixed die plate being adapted to receive said injection mechanism for injecting molten resin into the cavity formed by joining said supported moveable die and said supported fixed die;
    mechanical positioning means fastened adjacent to said fixed die plate and adapted to restrict the movement of said moveable die plate away from said fixed die plate at said compression starting position;
    adjusting means fastened adjacent to said fixed die plate and adapted to adjust the height of said mechanical positioning means with respect to said fixed die plate and for adjusting the parallelism of said moveable die plate to said fixed die plate;
    position sensing means for detecting the position of said moveable die plate relative to said fixed die plate and for producing a control signal responsive to such detection;
    first compression means adapted to move said moveable die plate from said compression starting position toward said fixed die plate to compress molten resin which has been injected into said cavity; and control means for controlling said first compression means in accordance with the control signal produced by said position sensing means.

3. An injection press device in accordance with claim 2 wherein said die moving means is operated by the pressure of an operating fluid, and wherein said first compression means is operated by the pressure of an operating fluid.

4. An injection press device in accordance with claim 3 further comprising first supply means for supplying operating liquid to said die moving means, and second supply means for supplying operating liquid to said first compression means, said second supply means being operable independently from said first supply means.

5. An injection press device in accordance with claim 2 wherein said adjusting means comprises at least two rods, and means for adjusting the vertical position of each such rod with respect to said fixed die plate, said mechanical positioning means being secured to said at least two rods.

6. An injection press device in accordance with claim 2 wherein said die moving means is adapted to reciprocally move said moveable die plate to bring the supported moveable die into contact with the supported fixed die and then to move the supported moveable die away from the supported fixed die to said compression starting position.

7. An injection press device in accordance with claim 2 further comprising an injection mechanism for injecting molten resin into the cavity formed by joining the supported moveable die and the supported fixed die.

8. An injection press device in accordance with claim 2 wherein said mechanical positioning means comprises a projection and recess fitting portion disposed between said fixed die plate and said moveable die plate, and clamping means for clamping said projection and recess fitting portion in order to maintain said moveable die plate at said compression starting position.

9. An injection press device in accordance with claim 8 wherein said adjusting means comprises at least one lift guide rod for guiding the stroke of said moveable die plate, and means for adjusting the vertical position of each such lift guide rod with respect to said fixed die plate, said mechanical positioning means being secured to said at least one lift guide rod.

10. An injection press device in accordance with claim 9 wherein said first compression means adapted to move said moveable die plate from said compression starting position toward said fixed die plate comprises a lift frame for supporting said moveable die plate, and a plurality of fluid operated compression cylinders positioned between said lift frame and said moveable die plate.

11. An injection press device in accordance with claim 10 wherein said die moving means accomplishes the reciprocal movement of said moveable die plate by reciprocally moving said lift frame.

12. An injection press device in accordance with claim 10 wherein said control means controls the flow and the pressure level of operating fluid to said plurality of compression cylinders in accordance with the control signal produced by said position sensing means in order to compress the injected molten resin while maintaining the parallelism of said moveable die plate with respect to said fixed die plate during the compression of said injected molten resin.

13. An injection press device in accordance with claim 2 wherein said first compression means adapted to move said moveable die plate from said compression starting position toward said fixed die plate comprises a lift frame for supporting said moveable die plate, and a plurality of fluid operated compression cylinders positioned between said lift frame and said moveable die plate.

14. An injection press device in accordance with claim 13 wherein said die moving means accomplishes the reciprocal movement of said moveable die plate by reciprocally moving said lift frame.

15. An injection press device in accordance with claim 2 wherein said adjusting means comprises at least one lift guide rod for guiding the stroke of said moveable die plate, and means for adjusting the vertical position of each such lift guide rod with respect to said fixed die plate, said mechanical positioning means being secured to said at least one lift guide rod.

16. An injection press device in accordance with claim 2 wherein said mechanical positioning means comprises second compression means moveably secured to said fixed die plate and adapted to move to the backside of said moveable die plate which is away from said fixed die plate.

17. An injection press device in accordance with claim 16 wherein said adjusting means comprises a rod associated with said fixed die plate and connected to a support frame having a supporting point of movement of said second compression means, and a height adjuster for moving said support frame.

18. An injection press device in accordance with claim 2 wherein said first compression means comprises a plurality of compression cylinders; and wherein said control means controls the flow and the pressure level of operating fluid to said plurality of compression cylinders in accordance with the control signal produced by said position sensing means in order to compress the injected molten resin while maintaining the parallelism of said moveable die plate with respect to said fixed die plate during the compression of said injected molten resin.

19. An injection press device characterized by:
a fixed die plate supporting a fixed die;
a lift guide rod erected from said fixed die plate;
a moveable die plate supporting a moveable die which is brought into contact with said fixed die and moved away from said fixed die by a liquid pressure means as guided by said lift guide rod;
an injection mechanism for injecting molten resin into a cavity formed by joining said fixed die and said moveable die;
mechanical positioning means fastened adjacent to said fixed die plate for the purpose of restricting the return movement of said moveable die plate at a compression starting position during a stroke of said moveable die plate;
an adjuster for adjusting the height of said mechanical positioning means and adjusting the parallelism of said moveable die plate to said fixed die plate;
compression liquid pressure means provided independently from said liquid pressure means, said liquid pressure means being for the purpose of moving said moveable die plate to said compression starting position, said compression liquid pressure means being for the purpose of moving said moveable die plate from said compression starting position towards said fixed die plate to compress molten material which has been injected into said cavity;

a servo valve for controlling the quantity of operating fluid to be supplied to said compression liquid pressure means;

a position sensor for detecting the position of said moveable die plate; and control means for adjusting the degree of opening of said servo valve connected to said compression liquid pressure means in accordance with the result of detection performed by said position sensor;

wherein said mechanical positioning means comprises a sleeve arranged to be penetrated by said lift guide rod, a catcher case secured to said lift guide rod and into which said sleeve is fitted, and clamping means fastened to said catcher case and for abutting said sleeve; wherein said lift guide rod is screw-fixed to said fixed die plate; and wherein said adjuster comprises means for rotating said lift guide rod.

20. An injection press device adapted to injection press form molten resin in a cavity formed by joining a moveable die and a fixed die, said injection press device being characterized by:

a fixed die plate adapted to support said fixed die;

a frame integrally formed with said fixed die plate;

a lift guide rod erected from said fixed die plate;

a liquid pressure means fastened to said frame;

a moveable die plate adapted to support said moveable die as said movable die is brought into contact with said fixed die and moved away from the same to a compression starting position by said liquid pressure means, said moveable die plate having a back side remote from said fixed die plate;

an injection mechanism adapted to inject molten resin into the cavity formed by joining the moveable die and the fixed die;

mechanical positioning means fastened adjacent to said fixed die plate for the purpose of restricting the return movement of said moveable die plate at said compression starting position during a stroke of said moveable die plate;

an adjuster for adjusting the height of said mechanical positioning means and adjusting the parallelism of said moveable die plate relative to said fixed die plate;

compression liquid pressure means provided independently from said liquid pressure means, said compression liquid pressure means being for the purpose of moving said moveable die plate from said compression starting position towards said fixed die plate;

a servo valve for controlling the quantity of operating fluid to be supplied to said compression liquid pressure means;

a position sensor for detecting the position of said moveable die plate; and control means for adjusting the degree of opening of said servo valve connected to said compression liquid pressure means in accordance with the result of detection performed by said position sensor;

wherein said mechanical positioning means comprises at least one compression cylinder moveably fastened to said fixed die plate and capable of moving to said back side of said moveable die plate; and wherein said adjuster is provided with a screw rod penetrating said fixed die plate and connected to said mechanical positioning means so that said mechanical positioning means can be vertically moved.

* * * * *